US009759584B2

(12) United States Patent
Kato (10) Patent No.: US 9,759,584 B2
(45) Date of Patent: Sep. 12, 2017

(54) ENCODER HAVING A DETECTION HEAD WITH A REFERENCE DETECTION RECEIVING GRATING AND A PHASE COMPENSATION RECEIVING GRATING

(71) Applicant: MITUTOYO CORPORATION, Kanagawa (JP)

(72) Inventor: Yoshiaki Kato, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 131 days.

(21) Appl. No.: 14/978,419

(22) Filed: Dec. 22, 2015

(65) Prior Publication Data
US 2016/0209246 A1 Jul. 21, 2016

(30) Foreign Application Priority Data
Jan. 21, 2015 (JP) .................................. 2015-009568

(51) Int. Cl.
*G01D 5/347* (2006.01)
*G01D 5/244* (2006.01)

(52) U.S. Cl.
CPC ..... *G01D 5/34746* (2013.01); *G01D 5/24438* (2013.01)

(58) Field of Classification Search
CPC ........... G01D 5/34746; G01D 5/34707; G01D 5/2457; G01D 5/347
USPC .............................. 250/231.13, 214 R, 237 G
See application file for complete search history.

(56) References Cited

U.S. PATENT DOCUMENTS

| 5,883,298 | A | 3/1999 | Holzapfel et al. |
| 6,635,863 | B1 * | 10/2003 | Nihommori ....... G01D 5/34715 |
| | | | 250/231.13 |
| 8,481,915 | B2 | 7/2013 | Otsuka et al. |
| 9,036,285 | B2 | 5/2015 | Kato |
| 2008/0013105 | A1 | 1/2008 | McMurtry et al. |

(Continued)

FOREIGN PATENT DOCUMENTS

| JP | 10-160442 A | 6/1998 |
| JP | 2008-503745 A | 2/2008 |

OTHER PUBLICATIONS

U.S. Appl. No. 14/943,309 to Yoshiaki Kato, which was filed on Nov. 17, 2015.

*Primary Examiner* — Que T Le
(74) *Attorney, Agent, or Firm* — Greenblum & Bernstein, P.L.C.

(57) ABSTRACT

In a scale, a reference detection pattern and a displacement detection pattern are formed. A detection head outputs a reference detection signal, a phase compensation signal, and a displacement detection signal. A signal processing unit generates a reference signal by amplifying one or both of the phase compensation signal and the reference detection signal and adding up them, and detects a position of the detection head relative to the scale. A combined light receiving grating includes a reference detection light receiving grating and a phase compensation light receiving grating disposed so as to be shifted from the reference detection light receiving grating in the measurement direction. A combined light receiving element includes a reference detection light receiving element configured to output the reference detection signal and a phase compensation light receiving element configured to output the phase compensation signal.

9 Claims, 10 Drawing Sheets

(56) References Cited

U.S. PATENT DOCUMENTS

2010/0270461 A1  10/2010  Tominaga
2011/0266424 A1  11/2011  Kawatoko et al.
2015/0276435 A1  10/2015  Mori et al.
2015/0346000 A1* 12/2015  Kato .................. G01D 5/24438
                                                250/231.1

* cited by examiner

ENCODER HAVING A DETECTION HEAD WITH A REFERENCE DETECTION RECEIVING GRATING AND A PHASE COMPENSATION RECEIVING GRATING

INCORPORATION BY REFERENCE

This application is based upon and claims the benefit of priority from Japanese patent application No. 2015-9568, filed on Jan. 21, 2015, the disclosure of which is incorporated herein in its entirety by reference.

BACKGROUND OF THE INVENTION

1. Field of the Invention

The present invention relates to an encoder and, for example, an optical linear encoder.

2. Description of Related Art

Currently, as a type of apparatus for measuring a displacement, an optical linear encoder has been known. The optical linear encoder includes a scale and a detection head that moves along the scale. The scale is provided with a reference pattern for detecting a reference position and a main pattern for detecting a relative displacement between the scale and the detection head. The optical linear encoder detects the reference position by detecting a reference signal having a width equivalent to the pitch of the main pattern while using the reference pattern formed on the scale as a reference. An absolute positional relation between the scale and the detection head can be detected by taking the above-described displacement into account while using the reference position as the reference.

As a method for determining a reference position, a method in which the phase of a main signal indicating a detection result of a main pattern is synchronized with that of a reference signal has been known. For example, a technique for including a reference pattern in a main pattern in order to synchronize the phase of the reference signal with that of the main signal has been proposed (Japanese Unexamined Patent Application Publication No. H10-160442)

Further, a method in which a reference pattern and a main pattern are disposed in mutually different tracks and the phase of a reference signal is synchronized with that of a main signal in order to fine-adjust (i.e., fine-correct) rotational mechanical misalignment around a light incident direction has been disclosed (Published Japanese Translation of PCT International Publication for Patent Application, No. 2008-503745)

SUMMARY OF THE INVENTION

However, the present inventor has found the following problems in the above-described techniques. In the method disclosed in Japanese Unexamined Patent Application Publication No. H10-160442, when the detection head intersects the reference pattern, the main signal may deteriorate, thus deteriorating the measurement accuracy.

In the method disclosed in Published Japanese Translation of PCT International Publication for Patent Application, No. 2008-503745, since the main pattern does not include the reference pattern therein, the above-described problem does not occur. However, in the method disclosed in Published Japanese Translation of PCT International Publication for Patent Application, No. 2008-503745, when the repetition period of the main signal is short, the alignment in the rotational direction needs to be precisely adjusted. When the accuracy of the adjustment of the alignment in the rotational direction is insufficient and hence a deviation in the rotational direction occurs in attachment of the detection head, the accuracy of the reference position deteriorates. However, it is very difficult to perform such an alignment adjustment with sufficient accuracy.

An object of the present invention is to provide an encoder capable of maintaining the accuracy of a reference position even if an error occurs in attachment of a detection head.

A first exemplary aspect of the present invention is an encoder including:

a scale with a reference detection pattern for detecting a reference position in a measurement direction formed therein and a displacement detection pattern for detecting a displacement in the measurement direction formed therein;

a detection head configured to output a reference detection signal, a phase compensation signal, and a displacement detection signal, the reference detection signal and the phase compensation signal being detection results of the reference detection pattern, the displacement detection signal being a detection result of the displacement detection pattern; and a signal processing unit configured to generate a reference signal by amplifying one or both of the phase compensation signal and the reference detection signal and adding up them, and detects a position of the detection head relative to the scale based on the reference signal and the displacement detection signal, in which the detection head includes:

a light source configured to emit light to the scale;

a combined light receiving grating including a reference detection light receiving grating configured to let light from the reference detection pattern pass therethrough, and a phase compensation light receiving grating configured to let the light from the reference detection pattern pass therethrough, the phase compensation light receiving grating being disposed so as to be shifted from the reference detection light receiving grating in the measurement direction; and a combined light receiving element including a reference detection light receiving element configured to photoelectric-convert the light passing through the reference detection light receiving grating to output the reference detection signal, and a phase compensation light receiving element configured to photoelectric-convert the light passing through the phase compensation light receiving grating to output the phase compensation signal.

A second exemplary aspect of the present invention is the above-described encoder, in which a width in the measurement direction of a grating constituting the phase compensation light receiving grating is the same predetermined width as a width in the measurement direction of a grating constituting the reference detection light receiving grating, and the grating constituting the phase compensation light receiving grating is disposed so as to be shifted from the grating constituting the reference detection light receiving grating in the measurement direction by a distance equal to half the predetermined width.

A third exemplary aspect of the present invention is the above-described encoder, in which a plurality of gratings constituting the reference detection light receiving grating are arranged in a row in the measurement direction, and each of a plurality of gratings constituting the phase compensation light receiving grating is disposed so as to be shifted from a corresponding one of the plurality of gratings constituting the reference detection light receiving grating.

A fourth exemplary aspect of the present invention is the above-described encoder, in which the phase compensation light receiving grating is disposed so as to be apart from the reference detection light receiving grating in a direction that is in parallel with a surface of the scale on which the reference detection light receiving grating and the phase compensation light receiving grating are formed and perpendicular to the measurement direction.

A fifth exemplary aspect of the present invention is the above-described encoder, in which the signal processing unit includes:

an amplifier configured to amplify an amplitude value of the phase compensation signal by a factor ranging from −1 to 1; and an adder configured to output a signal obtained by adding the amplified phase compensation signal and the reference signal as the reference signal.

A sixth exemplary aspect of the present invention is the above-described encoder, in which the light source emits collimated light to the scale.

A seventh exemplary aspect of the present invention is the above-described encoder, in which light that is emitted from the light source and passes through the scale is incident on the combined light receiving grating.

An eighth exemplary aspect of the present invention is the above-described encoder, in which light that is emitted from the light source and reflected on the scale is incident on the combined light receiving grating.

A ninth exemplary aspect of the present invention is the above-described encoder, in which the combined light receiving grating further includes a displacement detection light receiving grating configured to let light from the displacement detection pattern pass therethrough, and the combined light receiving element further includes a displacement detection light receiving element configured to photoelectric-convert the light passing through the displacement detection light receiving grating to output the displacement detection signal.

According to the present invention, it is possible to provide an encoder capable of maintaining the accuracy of a reference position even if an error occurs in the attachment of a detection head.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings. The same symbols are assigned to the same components throughout the drawings, and their duplicated explanation is omitted as appropriate.

First Exemplary Embodiment

Figure 1:
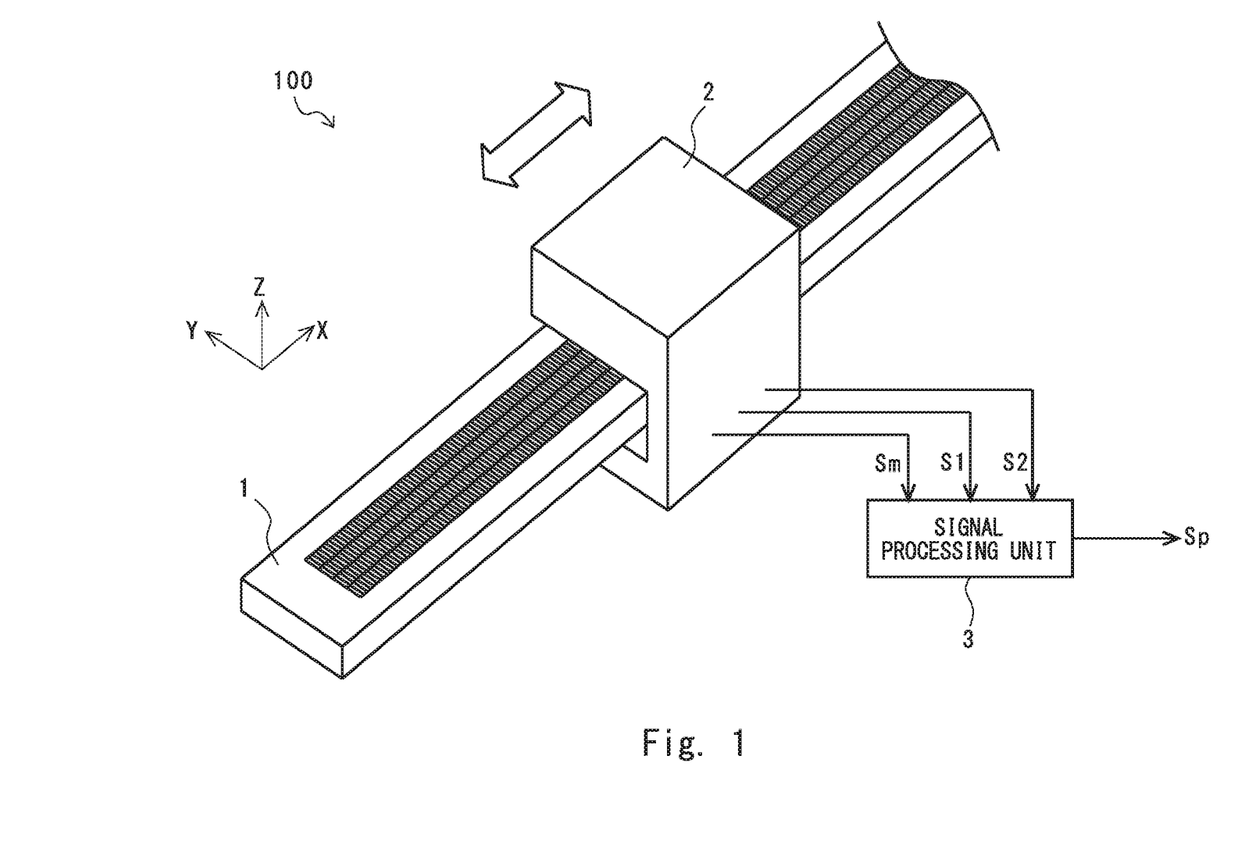
FIG. 1 is a perspective view showing a schematic configuration of an optical encoder according to a first exemplary embodiment.

An optical encoder according to a first exemplary embodiment of the present invention is explained. FIG. 1 is a perspective view showing a schematic configuration of an optical encoder 100 according to the first exemplary embodiment. As shown in FIG. 1, the optical encoder 100 includes a scale 1, a detection head 2, and a signal processing unit 3. The scale 1 and the detection head 2 are configured so that they can be moved relative to each other along a measurement direction (the X-axis direction in FIG. 1) which is in parallel with the longitudinal direction of the scale 1. The scale 1 is provided with a pattern used for position detection and interference light is generated when the pattern is irradiated with the light. The detection head 2 detects a change in the interference light in the measurement direction and outputs an electric signal indicating the detection result to the signal processing unit 3. The signal processing unit 3 can detect the positional relation between the scale 1 and the detection head 2 by signal-processing the received electric signal.

Note that in the following explanation, a direction that is perpendicular to the length measurement direction (the X-axis direction in FIG. 1) and indicates the width of the scale 1 is defined as a Y-axis direction. That is, the principal surface of the scale 1 is in parallel with the X-Y plane. Further, a direction that is perpendicular to the principal surface of the scale 1 (the X-Y plane), i.e., perpendicular to the X-axis and Y-axis, is defined as a Z-axis direction Further, in the perspective views which will be referred to in the following explanation, the direction that points from the lower-left (near) part of the drawing toward the upper-right (far) part is defined as a positive direction on the X-axis. The direction that points from the lower-right (near) part of the drawing toward the upper-left (far) part is defined as a positive direction on the Y-axis. The direction that points from the lower side of the drawing toward the upper side is defined as a positive direction on the Z-axis.

Figure 2:
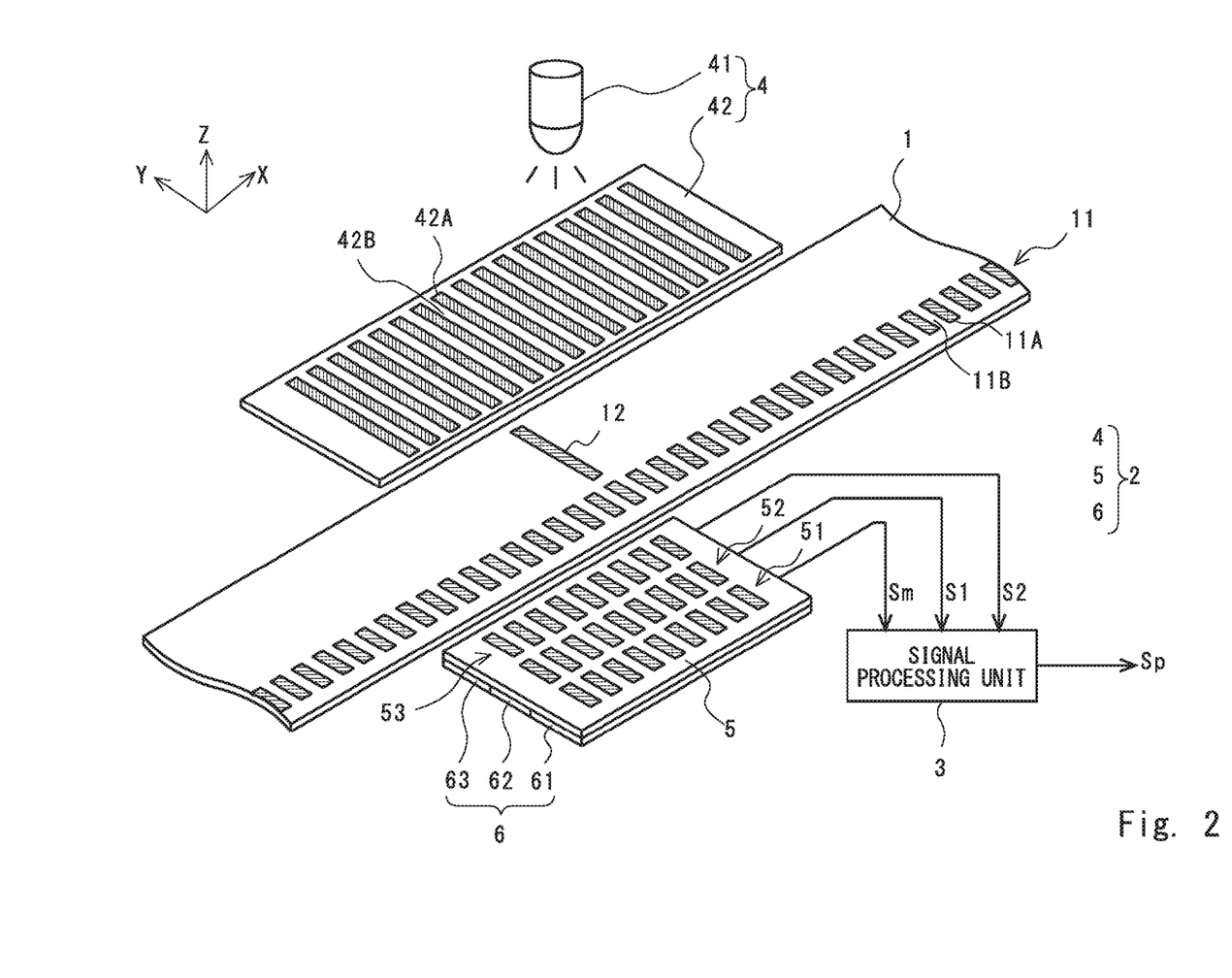
FIG. 2 is a perspective view showing a configuration of the optical encoder according to the first exemplary embodiment.

The optical encoder 100 is explained hereinafter in a more detailed manner. FIG. 2 is a perspective view showing a configuration of the optical encoder 100 according to the first exemplary embodiment. As shown in FIG. 2, the detection head 2 includes a light source 4, a combined light receiving grating 5, and a combined light receiving element 6. As described above, the scale 1 and the detection head 2 are configured so that they can be moved relative to each other in the measurement direction (X-axis direction in FIG. 2).

The light source 4 includes a light source element 41 and a light source grating 42. The light source element 41 is disposed above the light source grating 42 (i.e., on the positive side on the Z-axis direction in FIG. 2). The light source grating 42 is a plate member whose principal surface is perpendicular to the Z-axis direction (i.e., in parallel with the X-Y plane) in FIG. 2 and whose longitudinal direction is in parallel with the X-axis direction. In the plate member that constitutes the light source grating 42, a plurality of lattice-like light-transmitting parts 42A whose longitudinal direction is in parallel with the Y-axis in FIG. 2 are arranged in a row in the X-axis direction. That is, in the light source grating 42, the light-transmitting parts 42A and non-transmitting parts 42B are arranged in the X-axis direction in an alternate and repetitive manner. As the light emitted by the light source element 41 passes through the light source grating 42, the light becomes collimated light propagating along the Z-axis. Examples of light sources that can be used for the light source element 41 include an LED (Light Emitting Diode), a semiconductor laser, an SLED (Self-Scanning Light Emitting Device), and an OLED (Organic light-emitting diode).

The scale 1 is a plate member whose principal surface is perpendicular to the Z-axis direction (i.e., in parallel with the X-Y plane) in FIG. 2 and whose longitudinal direction is in parallel with the X-axis direction. The scale 1 is disposed in a place on which the collimated light from the light source 4 is incident in a direction perpendicular to the principal surface (X-Y plane). In FIG. 2, the scale 1 is disposed on the negative side on the Z-axis direction relative to the light source 4.

In the plate member that constitutes the scale 1, a displacement detection pattern 11 and a reference detection pattern 12 are formed. In the displacement detection pattern 11, a plurality of lattice-like light-transmitting parts whose longitudinal direction is in parallel with the Y-axis in FIG. 2 are arranged in a row in the X-axis direction. That is, in the displacement detection pattern 11, light-transmitting parts 11A and non-transmitting parts 11B are arranged in the X-axis direction in an alternate and repetitive manner. The reference detection pattern 12 is formed as one lattice-like light-transmitting part (i.e., one rectangular light-transmitting part) whose longitudinal direction is in parallel with the Y-axis and disposed in a place that is apart from the displacement detection pattern 11 in the positive direction on the Y-axis. The scale 1 is preferably made of glass. However, any material can be used for the scale 1, provided that lattice-like light-transmitting parts that allow light to pass therethrough and non-transmitting parts that do not allow light to pass therethrough can be formed in the material.

The combined light receiving grating 5 is disposed in a place on which the light from the scale 1, i.e., the light that has passed through the scale 1, is incident. In FIG. 2, the combined light receiving grating 5 is disposed on the negative side on the Z-axis direction relative to the scale 1 and the light that has passed through the scale 1 is incident on the combined light receiving grating 5. Note that although the optical encoder 100 is a transmission-type optical encoder in this example, a reflection-type optical encoder can be used for the optical encoder 100. In such a case, the combined light receiving grating 5 is disposed on the positive side on the Z-axis direction relative to the scale 1 and the light that has reflected on the scale 1 is incident on the combined light receiving grating 5.

Figure 3:
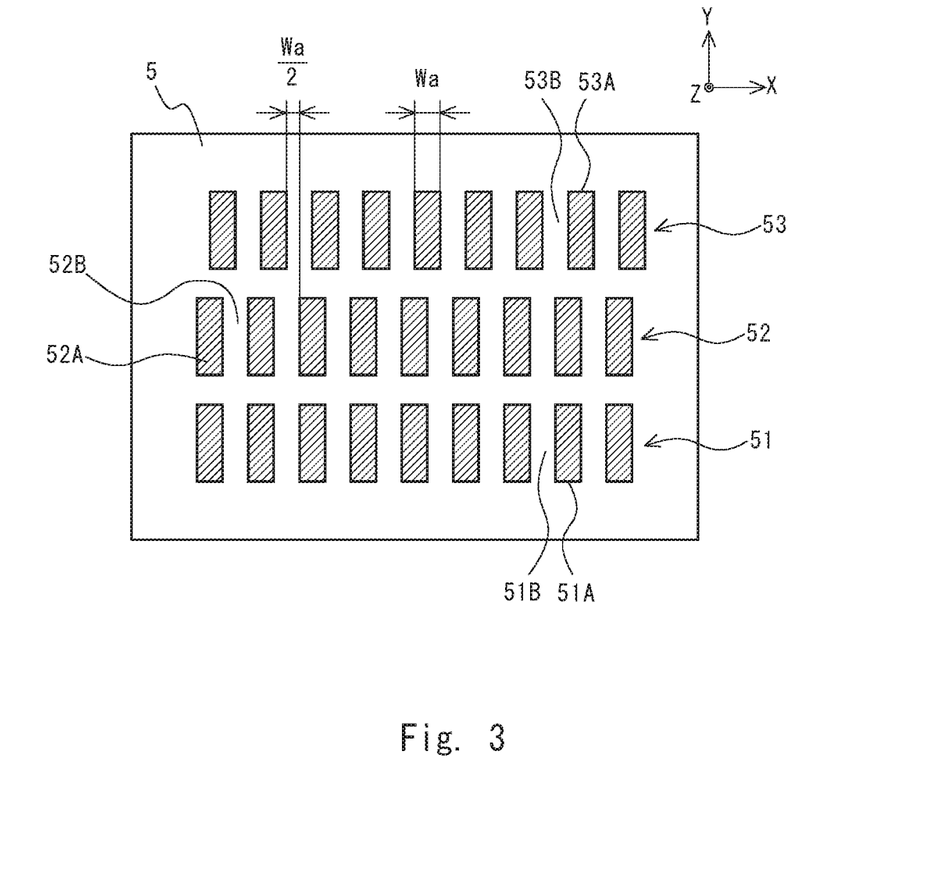
FIG. 3 is a plan view of a combined light receiving grating according to the first exemplary embodiment.

The combined light receiving grating 5 is a plate member whose principal surface is perpendicular to the Z-axis direction in FIG. 2 and whose longitudinal direction is in parallel with the X-axis direction. FIG. 3 is a plan view of the combined light receiving grating 5 according to the first exemplary embodiment. In the plate member that constitutes the combined light receiving grating 5, a displacement detection light receiving grating 51, a reference detection light receiving grating 52, and a phase compensation light receiving grating 53 are formed. The displacement detection light receiving grating 51 is disposed in a place on which the light that has passed through the displacement detection pattern 11 of the scale 1 is incident. The reference detection light receiving grating 52 and the phase compensation light receiving grating 53 are disposed in places on which the light that has passed through the reference detection pattern 12 of the scale 1 is incident. In this example, the reference detection light receiving grating 52 is formed in a place that is apart from the displacement detection light receiving grating 51 in the positive direction on the Y-axis. The phase compensation light receiving grating 53 is formed in a place that is apart from the reference detection light receiving grating 52 in the positive direction on the Y-axis.

In each of the displacement detection light receiving grating 51, the reference detection light receiving grating 52, and the phase compensation light receiving grating 53, a plurality of lattice-like light-transmitting parts whose longitudinal direction is in parallel with the Y-axis in FIG. 3 are arranged in a row in the X-axis direction. That is, in the displacement detection light receiving grating 51, light-transmitting parts 51A and non-transmitting parts 51B are arranged in the X-axis direction in an alternate and repetitive manner. In the reference detection light receiving grating 52, light-transmitting parts 52A and non-transmitting parts 52B are arranged in the X-axis direction in an alternate and repetitive manner. In the phase compensation light receiving grating 53, light-transmitting parts 53A and non-transmitting parts 53B are arranged in the X-axis direction in an alternate and repetitive manner.

The width Wa in the X-axis direction of each light-transmitting part 52A of the reference detection light receiving grating 52 is equal to the width Wa of each light-transmitting part 53A of the phase compensation light receiving grating 53. However, the light-transmitting parts 53A of the phase compensation light receiving grating 53 are disposed so as to be shifted from the light-transmitting parts 52A of the reference detection light receiving grating 52 in the measurement direction (X-axis direction). In FIG. 3, the light-transmitting parts 53A of the phase compensation light receiving grating 53 are disposed so as to be shifted from the light-transmitting parts 52A of the reference detection light receiving grating 52 in the positive direction on the X-axis by a distance equal to half the width Wa in the measurement direction (X-axis direction).

The combined light receiving element 6 is disposed in a place on which the light that has passed through the combined light receiving grating 5 is incident. In FIG. 2, the combined light receiving element 6 is disposed on the negative side on the Z-axis direction relative to the combined light receiving grating 5.

The combined light receiving element 6 includes a displacement detection light receiving element 61, a reference detection light receiving element 62, and a phase compensation light receiving element 63. Each of the displacement detection light receiving element 61, the reference detection light receiving element 62, and the phase compensation light receiving element 63 is preferably configured by a photodiode array. Alternatively, other light receiving means capable of converting incident light into an electric signal, such as phototransistors and photoresistors, may be used for the displacement detection light receiving element 61, the reference detection light receiving element 62, and the phase compensation light receiving element 63.

The displacement detection light receiving element 61, the reference detection light receiving element 62, and the phase compensation light receiving element 63 are disposed in their respective places where they receive light that has passed through the displacement detection light receiving grating 51, the reference detection light receiving grating 52, and the phase compensation light receiving grating 53, respectively.

The displacement detection light receiving element 61 converts light that has passed through the light source grating 42, the displacement detection pattern 11, and the displacement detection light receiving grating 51 into an electric signal and outputs the converted electric signal as a displacement detection signal Sm. The reference detection light receiving element 62 converts light that has passed through the light source grating 42, the reference detection pattern 12, and the reference detection light receiving grating 52 into an electric signal and outputs the converted electric signal as a reference detection signal S1. The phase compensation light receiving element 63 converts light that has passed through the light source grating 42, the reference detection pattern 12, and the phase compensation light receiving grating 53 into an electric signal and outputs the converted electric signal as a phase compensation signal S2.

As described previously, the light-transmitting parts 53A of the phase compensation light receiving grating 53 are disposed so as to be shifted from the light-transmitting parts 52A of the reference detection light receiving grating 52 in the measurement direction (X-axis direction). As a result, the phase compensation signal S2 becomes a signal that has a predetermined phase difference with respect to the reference detection signal S1. As shown in FIG. 2, the light-transmitting parts 53A of the phase compensation light receiving grating 53 are disposed so as to be shifted from the light-transmitting parts 52A of the reference detection light receiving grating 52 in the X-axis (+) direction by a distance equal to half the width in the measurement direction (X-axis direction) of the light-transmitting part in this exemplary embodiment. As a result, the phase compensation signal S2 has a phase difference of 90° with respect to the reference detection signal S1. In this exemplary embodiment, a reference signal $S_{orig}$ can be generated by amplifying one or both of the reference detection signal S1 and the phase compensation signal S2 and adding up them.

Figure 4:
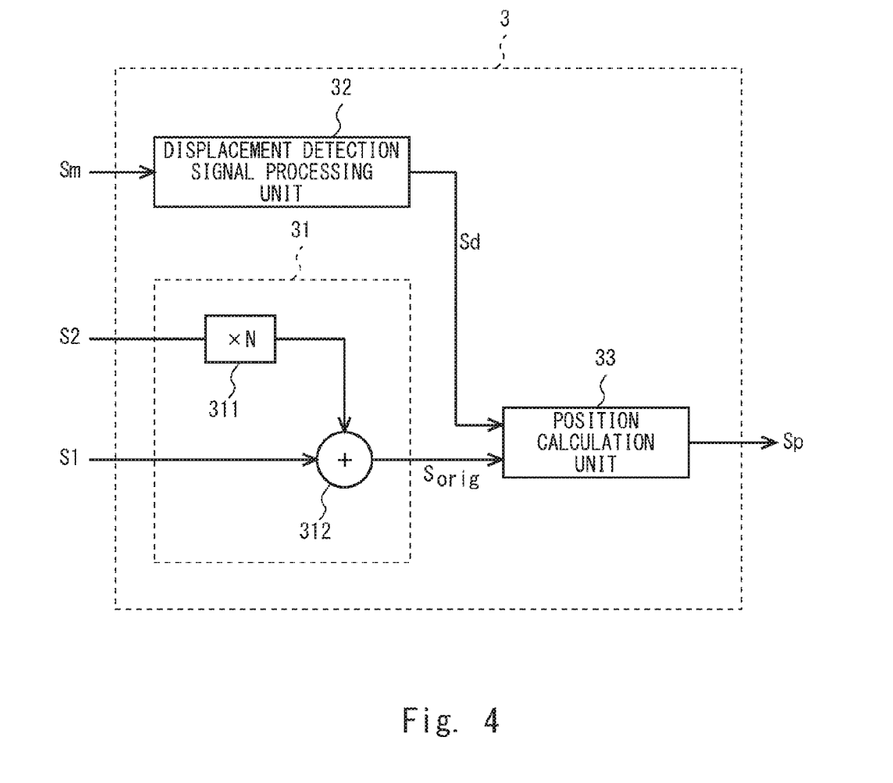
FIG. 4 is a block diagram showing a configuration of a signal processing unit according to the first exemplary embodiment.

Next, a configuration of the signal processing unit 3 is explained. Here, an example where the signal processing unit 3 amplifies the phase compensation signal S2 is explained. FIG. 4 is a block diagram showing a configuration of the signal processing unit 3 according to the first exemplary embodiment. The signal processing unit 3 includes a reference signal generation unit 31, a displacement signal processing unit 32, and a position detection unit 33.

The reference signal generation unit 31 outputs a phase-adjusted reference signal $S_{orig}$ by using the reference detection signal S1 and the phase compensation signal S2 output from the detection head 2. The reference signal $S_{orig}$ is maximized at the measurement reference position in the length measurement direction of the scale 1.

The displacement signal processing unit 32 detects a relative displacement between the scale 1 and the detection head 2 by using the displacement detection signal Sm output from the detection head 2. When the scale 1 and the detection head 2 are displaced relative to each other, the intensity of light received in the displacement detection light receiving element 61 changes according to the principle of Young's interference. As the intensity of light received in the displacement detection light receiving element 61 changes, the strength of the displacement detection signal Sm changes. The displacement signal processing unit 32 can measure a relative displacement Sd in the length measurement direction (X-axis direction) by measuring the change in the strength of the displacement detection signal Sm.

The position detection unit 33 detects an absolute positional relation between the scale 1 and the detection head 2, i.e., the position of the detection head 2 relative to the scale 1, from the reference signal $S_{orig}$ output from the reference signal generation unit 31 and the relative displacement Sd output from the displacement signal processing unit 32. The position detection unit 33 outputs the detection result as, for example, a position detection signal Sp.

The reference signal generation unit 31 is explained hereinafter. The reference signal generation unit 31 outputs a phase-adjusted reference signal $S_{orig}$ by using the reference detection signal S1 and the phase compensation signal S2 output from the detection head 2. As shown in FIG. 4, the reference signal generation unit 31 includes an amplifier 311 and an adder 312.

The amplifier 311 amplifies the phase compensation signal S2 and outputs the amplified signal to the adder 312. The gain (or the amplification factor) of the amplifier 311 can be changed in a range from −1 to 1. Any configuration capable of amplifying an electric signal, such as a transistor and an OP-amplifier (operational amplifier), can be used for the amplifier 311. Further, the amplification of the phase compensation signal S2 may be carried out by converting an analog phase compensation signal S2 into digital data and performing a digital operation on the digital data.

The adder 312 adds the amplified phase compensation signal S2 and the reference detection signal S1, and outputs the resultant signal as a reference signal $S_{orig}$. The reference signal $S_{orig}$ is output as a signal that is the phase-compensated reference detection signal S1. The adder 312 may be an analog adder circuit using an operational amplifier, or may be a digital adder circuit that converts an analog signal to be added into a digital value and performs an operation on the digital value.

As described above, the reference signal generation unit 31 can adjust the phase of the reference signal $S_{orig}$, which the reference signal generation unit 31 outputs, by adding up the reference detection signal S1 and the amplified phase compensation signal S2. The phase adjustment of the reference signal $S_{orig}$ performed by the reference signal generation unit 31 is explained hereinafter.

As described above, the phase compensation signal S2 has a phase difference of 90° with respect to the reference detection signal S1. That is, the reference detection signal S1 can be expressed by a cosine function (as shown in Young's interference fringes) and the phase compensation signal S2 can be expressed by a sine function. Therefore, the reference detection signal S1 and the phase compensation signal S2 can be expressed by the below-shown Expressions (1) and (2), respectively. Note that: A represents the amplitude of the reference detection signal S1; B represents the amplitude of the phase compensation signal S2; and θ represents the phase of the reference detection signal S1 and the phase compensation signal S2.

[Expression 1]

$$S1 = A\cos\theta \quad (1)$$

[Expression 2]

$$S2 = B\cos\theta \quad (2)$$

The reference signal $S_{orig}$, which is obtained by adding up the reference detection signal S1 and the phase compensation signal S2, is expressed by the below-shown Expression (3). Note that α represents the phase difference of the phase compensation signal S2 with respect to the reference detection signal S1.

[Expression 3]

$$S_{orig} = A\cos\theta + B\sin\theta \quad (3)$$
$$= \sqrt{A^2+B^2} \cdot \sin(\theta - \alpha)$$

[Expression 4]

$$\alpha = \arctan\left(\frac{B}{A}\right) \quad (4)$$

As shown in Expression (3), the reference signal $S_{orig}$ is expressed as a signal whose phase is shifted from the reference detection signal S1, which is expressed by a cosine function having the same period as that for the reference signal $S_{orig}$, by the phase difference α. As shown in Expression (4), the phase difference α is expressed as a function that includes the amplitude A of the reference detection signal S1 and the amplitude B of the phase compensation signal S2 as its variables. Therefore, the phase difference α can be adjusted by changing the gain of the amplifier 311. Since the gain of the amplifier 311 can be changed in a range from −1 to 1, the range of possible values for the phase difference α is expressed as "−45°≤α≤45°". The pitch at which the phase difference α changes can be suitably set by selecting an appropriate resolving power for the amplifier.

As has been described so far, according to the above-described configuration, it is possible to output, as the reference signal $S_{orig}$, a signal obtained by shifting the phase of the reference detection signal S1, which is obtained by amplifying the amplitude value of the phase compensation signal S2, which has a phase difference with respect to the reference detection signal S1, at a predetermined gain and adding the amplified signal to the reference detection signal S1.

Figure 5:
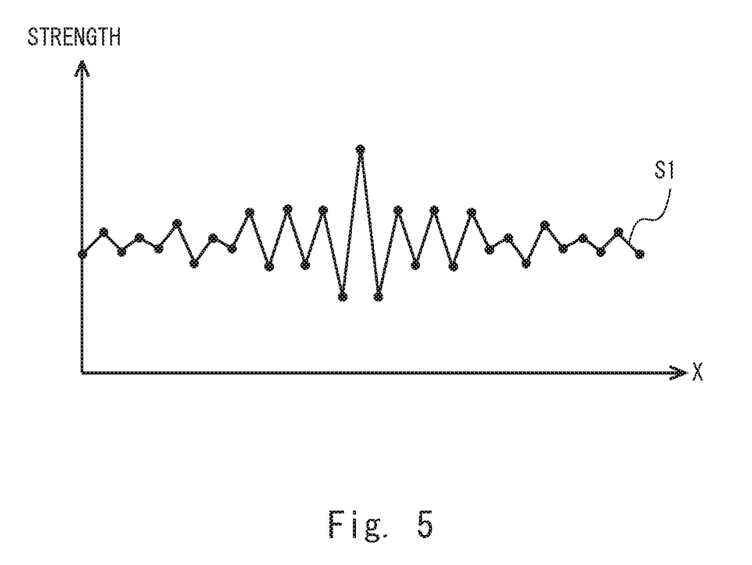
FIG. 5 is a graph showing an example of a reference detection signal.
Figure 6:
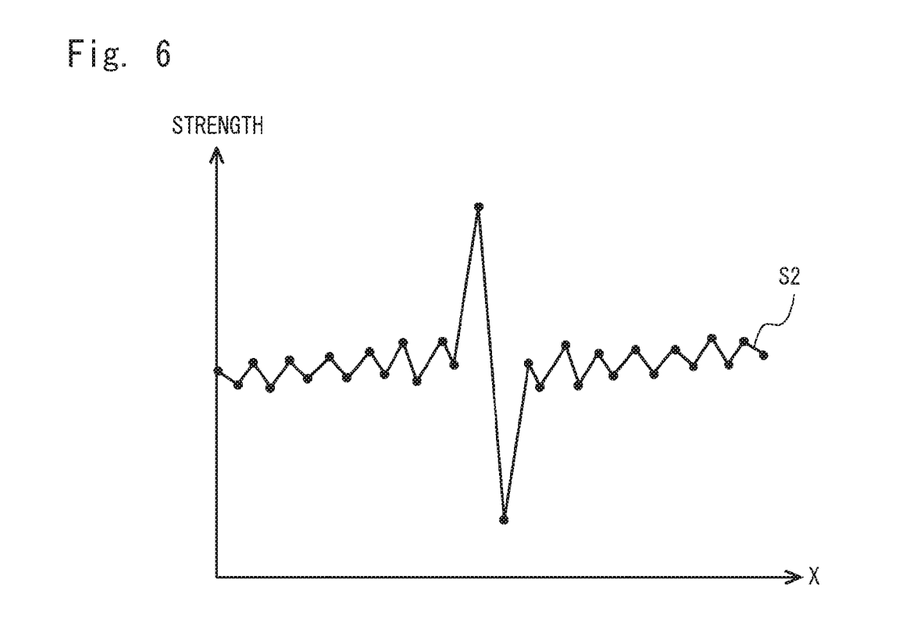
FIG. 6 is a graph showing an example of a phase compensation signal.

Note that the signal strength of each of the reference detection signal S1 and the phase compensation signal S2 decreases as the distance from the peak at or near the reference position in the phase direction increases. FIG. 5 is a graph showing an example of the reference detection signal S1. FIG. 6 is a graph showing an example of the phase compensation signal S2. In FIG. 5, the horizontal axis indicates the position of the scale 1 in the moving direction (i.e., the phase of the reference detection signal S1) and the vertical axis indicates the signal strength of the reference detection signal S1. In FIG. 6, the horizontal axis indicates the position of the scale 1 in the moving direction (i.e., the phase of the phase compensation signal S2) and the vertical axis indicates the signal strength of the phase compensation signal S2. In FIGS. 5 and 6, the maximum values and the minimum values of the signal strength are connected by straight lines. However, when the sampling interval in the horizontal-axis direction is shortened, the reference detection signal S has a waveform close to a cosine function and the phase compensation signal S2 has a waveform close to a sine function.

Figure 7:
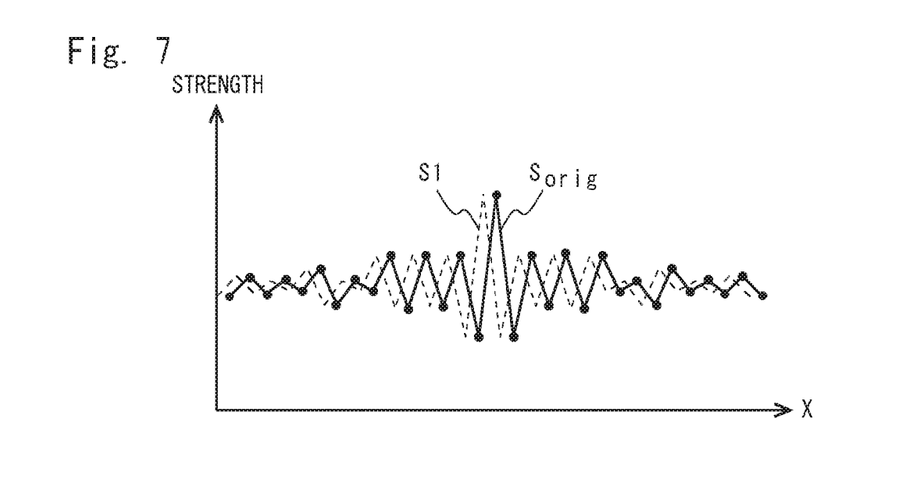
FIG. 7 is a graph showing an example of a reference signal obtained by adding a reference detection signal and a phase compensation signal.

FIG. 7 is a graph showing an example of the reference signal $S_{orig}$ obtained by adding up the reference detection signal S and the phase compensation signal S2. In FIG. 7, the horizontal axis indicates the position of the scale 1 in the moving direction (i.e., the phase of the reference signal $S_{orig}$) and the vertical axis indicates the signal strength of signals. Further, in FIG. 7, the reference detection signal S1 is indicated by a broken line and the phase compensation signal S2 is indicated by a solid line. As can be understood from FIG. 7, the reference signal $S_{orig}$ is shifted from the reference detection signal S1 in the horizontal-axis direction.

In this configuration, when a deviation occurs in the phase of the reference signal, which is obtained by positioning the scale 1 at the reference point, it is effective to adjust the phase shift amount α of the reference signal. That is, it is possible to cancel out a deviation in the phase of the reference signal relative to the actual reference position by changing the gain of the phase compensation signal until the deviation in the phase of the reference signal becomes zero in a state where the scale 1 is positioned at the reference point. In this way, it is possible to easily calibrate (i.e., cancel out) an optical deviation caused by mechanical misalignment by performing electric-signal processing.

Comparative Example

Next, an optical deviation caused by mechanical misalignment is explained by showing a comparative example. In this comparative example, a case in which a rotational deviation (misalignment) around the propagation direction of collimated light (the above-described Z-axis) occurs in an optical encoder is explained.

Figure 8:
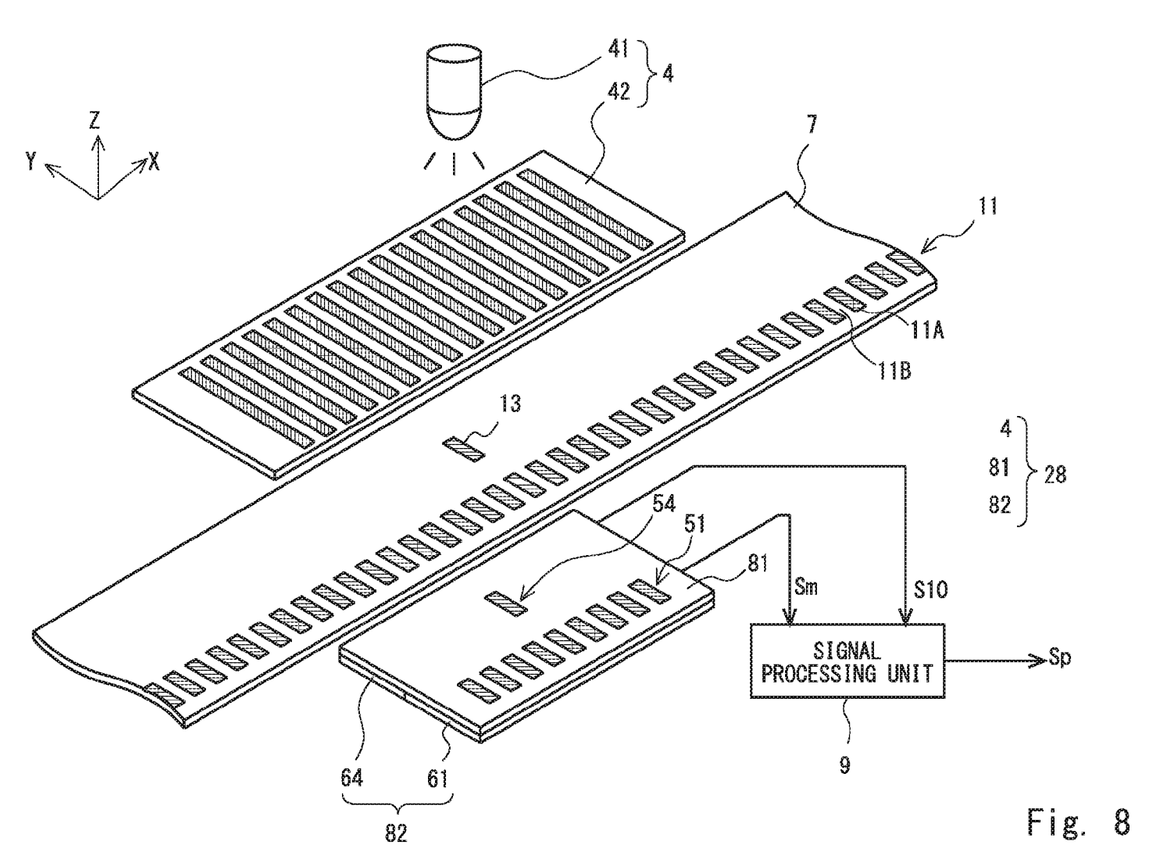
FIG. 8 is a perspective view schematically showing a configuration of an optical encoder according to a comparative example.

FIG. 8 is a perspective view schematically showing a configuration of an optical encoder 200 according to the comparative example. The optical encoder 200 includes a scale 7, a detection head 8, and a signal processing unit 9. The scale 7, the detection head 8, and the signal processing unit 9 of the optical encoder 200 correspond to the scale 1, the detection head 2, and the signal processing unit 3 of the above-described optical encoder 100, respectively.

The detection head 8 includes a light source 4, a combined light receiving grating 81, and a combined light receiving element 82. The light source 4 is similar to the light source 4 of the above-described optical encoder 100 and therefore its explanation is omitted.

In the plate member that constitutes the scale 7, a displacement detection pattern 11 and a reference detection pattern 13 are formed. The displacement detection pattern 11 is similar to the displacement detection pattern 11 of the above-described optical encoder 100 and therefore its explanation is omitted. The reference detection pattern 13 is similar to the reference detection pattern 12 of the above-described optical encoder 100 and therefore its explanation is omitted.

The combined light receiving grating 81 corresponds to the combined light receiving grating 5 of the optical encoder 100. In the plate member that constitutes the combined light receiving grating 81, a displacement detection light receiving grating 51 and a reference detection light receiving grating 54 are formed. The displacement detection light receiving grating 51 is similar to the displacement detection light receiving grating 51 of the above-described optical encoder 100 and therefore its explanation is omitted. The reference detection light receiving grating 54 is disposed in a place on which the light that has passed through the reference detection pattern 13 of the scale 7 is incident. In this comparative example, the reference detection light receiving grating 54 is formed in a place that is apart from the displacement detection light receiving grating 51 in the positive direction on the Y-axis.

The combined light receiving element 82 corresponds to the combined light receiving element 6 of the optical encoder 100. The combined light receiving element 82 includes a displacement detection light receiving element 61 and a reference detection light receiving element 64. The displacement detection light receiving element 61 is similar to the displacement detection light receiving element 61 of the above-described optical encoder 100 and therefore its explanation is omitted. The reference detection light receiving element 64 is disposed in a place where it receives light that has passed through the reference detection light receiving grating 54. The reference detection light receiving element 64 converts light that has passed through the light source grating 42, the reference detection pattern 13, and the reference detection light receiving grating 54 into an electric signal and outputs the converted electric signal as a reference signal S10.

Figure 9:
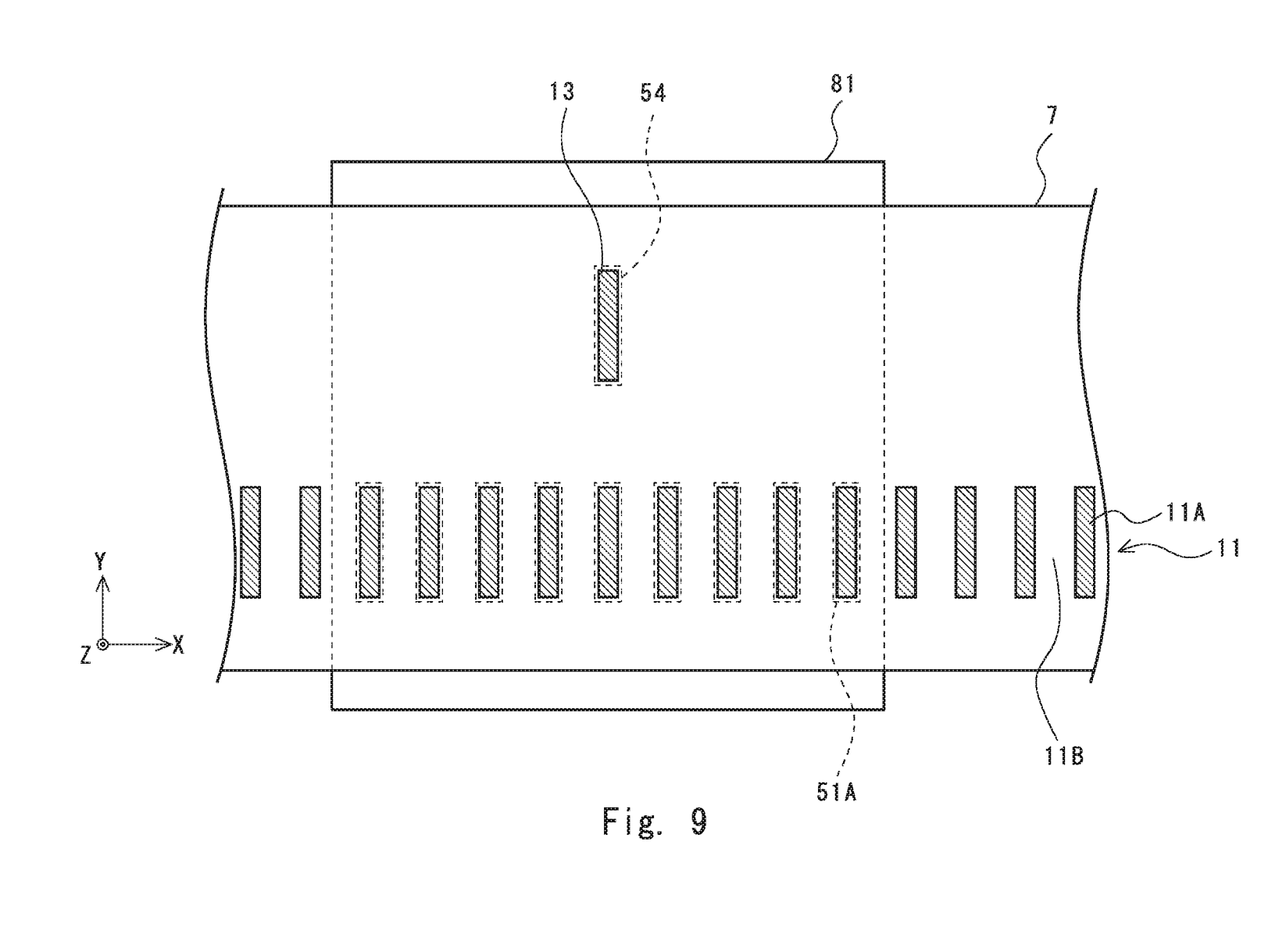
FIG. 9 is a plan view of a scale and a combined light receiving grating in a state where no rotational deviation occurs in the optical encoder according to the comparative example.

FIG. 9 is a plan view of the scale 7 and the combined light receiving grating 81 in a state where no rotational deviation occurs in the optical encoder 200 according to the comparative example. As shown in FIG. 9, when no rotational deviation occurs around the Z-axis, the position of the displacement detection pattern 11 of the scale 7 coincides with that of the displacement detection light receiving grating 51 and the position of the the reference detection pattern 13 of the scale 7 coincides with that of the reference detection light receiving grating 54. Therefore, since there is no phase difference between the detection of the displacement detection pattern 11 and that of the reference detection pattern 13, the detection result of the reference detection pattern 13 can be used as they are as the reference signal.

Figure 10:
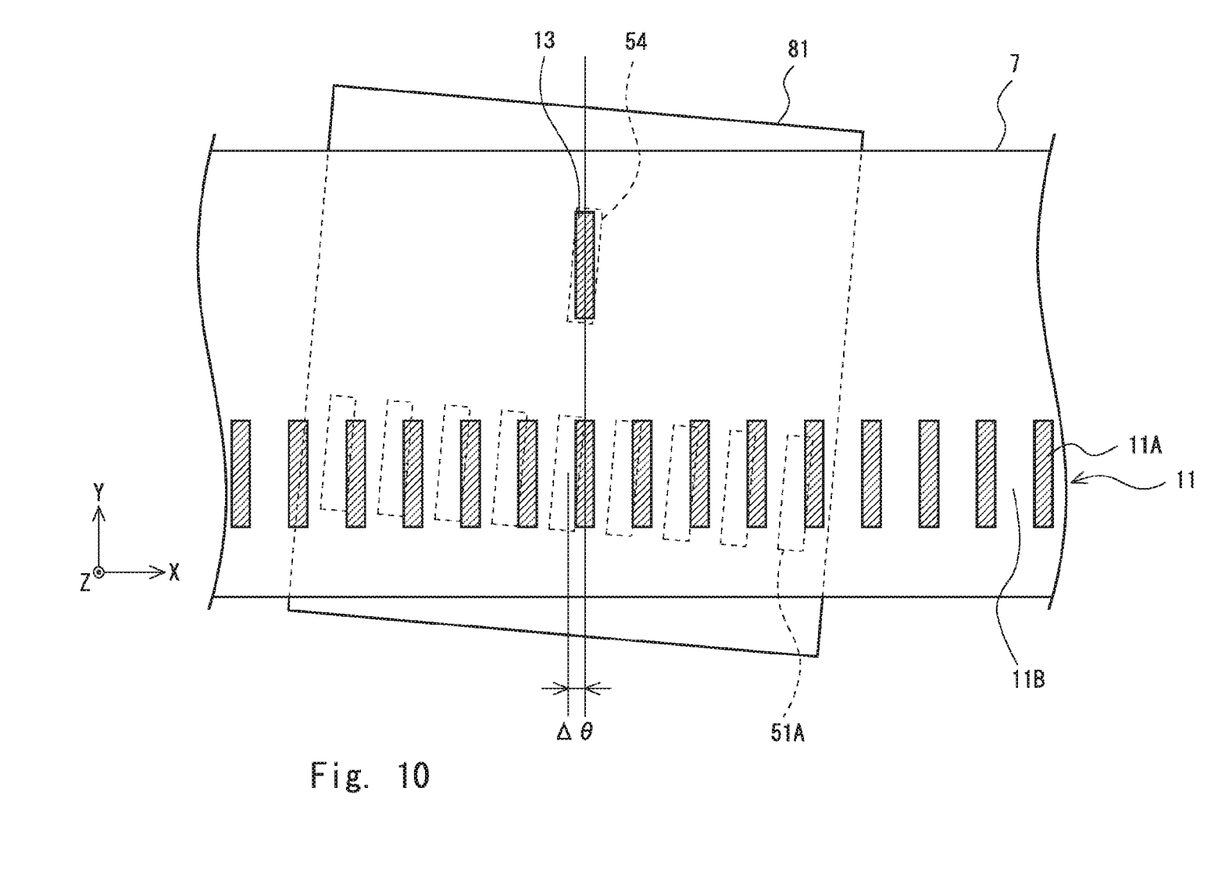
FIG. 10 is a plan view of the scale and the combined light receiving grating in a state where a rotational deviation occurs in the optical encoder according to the comparative example.

As a case contrary to the above-described case, a case in which a rotational deviation around the Z-axis occurs in the optical encoder 200 is examined. FIG. 10 is a plan view of the scale 7 and the combined light receiving grating 81 in a state where a rotational deviation occurs in the optical encoder 200 according to the comparative example. In this example, a deviation that occurs in a state where the center of the reference detection pattern 13 of the scale 7 coincides with the center of the reference detection light receiving grating 54 is closely examined. As shown in FIG. 10, when a rotational deviation around the X-axis occurs, a positional deviation $\Delta\theta$ occurs between the displacement detection pattern 11 of the scale 7 and the displacement detection light receiving grating 51 in the state where the center of the reference detection pattern 13 of the scale 7 coincides with the center of the reference detection light receiving grating 54.

Figure 11:
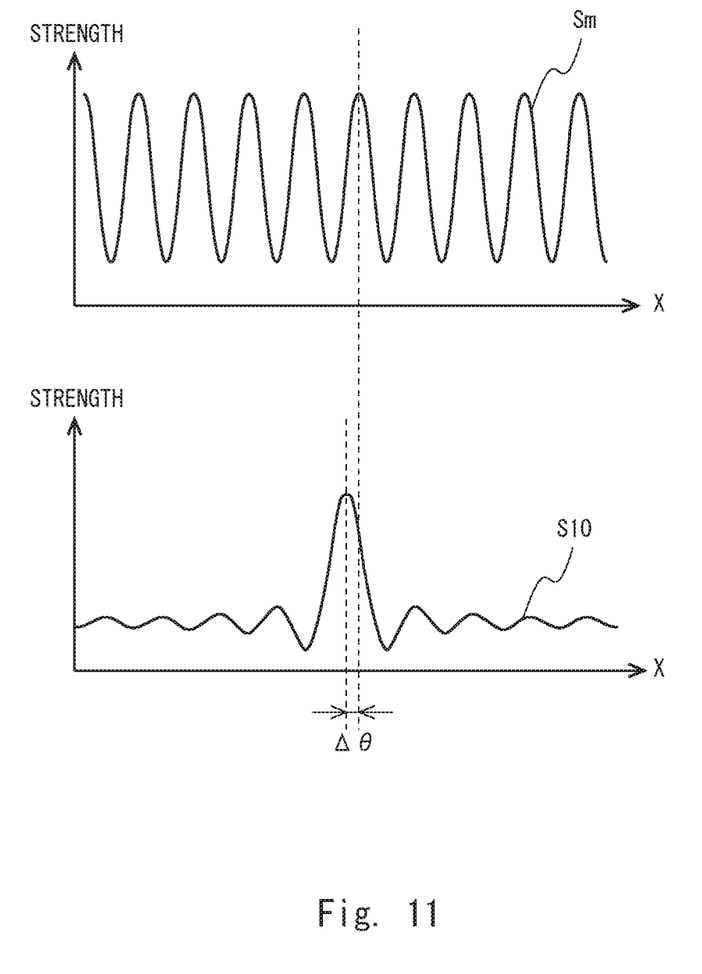
FIG. 11 is graphs showing examples of a reference signal and a displacement detection signal in a state where a rotational deviation occurs in the optical encoder according to the comparative example.

FIG. 11 is graphs showing examples of the reference signal and the displacement detection signal in a state where a rotational deviation occurs in the optical encoder 200 according to the comparative example. In FIG. 11, the horizontal axis indicates the displacement of the scale 7 and the vertical axis indicates the signal strength. When there is no rotational deviation, the phase of the displacement detection signal is 0° when the reference signal is detected. However, as shown in FIG. 11, as a rotational deviation occurs, the displacement detection signal is shifted by $\Delta\theta$ when the reference signal is detected. Since the phase of the displacement detection signal is shifted when the reference signal is detected, the displacement of the detection head 8 detected by the optical encoder 200 includes an error.

In the above-described configuration according to the present invention, even when a positional deviation $\Delta\theta$ like the one described above occurs, the positional deviation $\Delta\theta$ can be cancelled out by changing the gain of the phase compensation signal. As a result, it is possible to easily calibrate (i.e., cancel out) the phase deviation caused by the rotational deviation.

Other Exemplary Embodiments

Further, the present invention is not limited to the aforementioned exemplary embodiments and may be changed as appropriate without departing from the spirit of the present invention. For example, the above-described exemplar) embodiment is explained on the assumption that the optical encoder according to the present invention is a linear encoder. However, this is merely an example. That is, the present invention may be applied to a rotary encoder.

In the above-described exemplary embodiment, the shift amount of the phase compensation light receiving grating 53 from the reference detection light receiving grating 52 in the combined light receiving grating 5 is equal to half the width of the grating. However, the shift amount is not limited to such an amount.

Further, the order of the displacement detection light receiving grating 51, the reference detection light receiving grating 52, and the phase compensation light receiving grating 53 in the combined light receiving grating 5 is merely an example. That is, the order of them may be changed. In such cases, the displacement detection light receiving element 61, the reference detection light receiving element 62, and the phase compensation light receiving element 63 are disposed in places corresponding to the displacement detection light receiving grating 51, the reference detection light receiving grating 52, and the phase compensation light receiving grating 53, respectively.

Further, any combination of materials in which non-transmitting parts and light-transmitting parts are formed can be used for each of the grating and the scale. That is, an opaque glass may be used and lattice-like openings may be formed therein. Alternatively, a transparent glass may be used and non-transmitting parts may be formed by shielding parts of the glass. Further, materials other than glass may also be used in a similar fashion.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. An encoder comprising:
a scale with a reference detection pattern for detecting a reference position in a measurement direction formed therein and a displacement detection pattern for detecting a displacement in the measurement direction formed therein;

a detection head configured to output a reference detection signal, a phase compensation signal, and a displacement detection signal, the reference detection signal and the phase compensation signal being detection results of the reference detection pattern, the displacement detection signal being a detection result of the displacement detection pattern; and a signal processing unit configured to generate a reference signal by amplifying one or both of the phase compensation signal and the reference detection signal and adding up them, and detects a position of the detection head relative to the scale based on the reference signal and the displacement detection signal, wherein the detection head comprises:

a light source configured to emit light to the scale;

a combined light receiving grating comprising a reference detection light receiving grating configured to let light from the reference detection pattern pass therethrough, and a phase compensation light receiving grating configured to let the light from the reference detection pattern pass therethrough, the phase compensation light receiving grating being disposed so as to be shifted from the reference detection light receiving grating in the measurement direction; and a combined light receiving element comprising a reference detection light receiving element configured to photoelectric-convert the light passing through the reference detection light receiving grating to output the reference detection signal, and a phase compensation light receiving element configured to photoelectric-convert the light passing through the phase compensation light receiving grating to output the phase compensation signal.

2. The encoder according to claim 1, wherein a width in the measurement direction of a grating constituting the phase compensation light receiving grating is the same predetermined width as a width in the measurement direction of a grating constituting the reference detection light receiving grating, and the grating constituting the phase compensation light receiving grating is disposed so as to be shifted from the grating constituting the reference detection light receiving grating in the measurement direction by a distance equal to half the predetermined width.

3. The encoder according to claim 1, wherein a plurality of gratings constituting the reference detection light receiving grating are arranged in a row in the measurement direction, and each of a plurality of gratings constituting the phase compensation light receiving grating is disposed so as to be shifted from a corresponding one of the plurality of gratings constituting the reference detection light receiving grating.

4. The encoder according to claim 1, wherein the phase compensation light receiving grating is disposed so as to be apart from the reference detection light receiving grating in a direction that is in parallel with a surface of the scale on which the reference detection light receiving grating and the phase compensation light receiving grating are formed and perpendicular to the measurement direction.

5. The encoder according to claim 1, wherein the signal processing unit comprises:

an amplifier configured to amplify an amplitude value of the phase compensation signal by a factor ranging from −1 to 1; and an adder configured to output a signal obtained by adding the amplified phase compensation signal and the reference signal as the reference signal.

6. The encoder according to claim 1, wherein the light source emits collimated light to the scale.

7. The encoder according to claim 1, wherein light that is emitted from the light source and passes through the scale is incident on the combined light receiving grating.

8. The encoder according to claim 1, wherein light that is emitted from the light source and reflected on the scale is incident on the combined light receiving grating.

9. The encoder according to claim 1, wherein the combined light receiving grating further comprises a displacement detection light receiving grating configured to let light from the displacement detection pattern pass therethrough, and the combined light receiving element further comprises a displacement detection light receiving element configured to photoelectric-convert the light passing through the displacement detection light receiving grating to output the displacement detection signal.

* * * * *